United States Patent [19]

Kühlthau

[11] 4,392,998
[45] Jul. 12, 1983

[54] ONE POT DIAZOTIZATION, COUPLING AND QUATERNIZATION OF AMINOTRIAZOLES

[75] Inventor: Hans-Peter Kühlthau, Leverkusen, Fed. Rep. of Germany

[73] Assignee: Bayer Aktiengesellschaft, Leverkusen, Fed. Rep. of Germany

[21] Appl. No.: 236,490

[22] Filed: Feb. 23, 1981

[30] Foreign Application Priority Data

Mar. 11, 1980 [DE] Fed. Rep. of Germany ....... 3009267

[51] Int. Cl.³ .................... C07C 107/00; C09B 43/00
[52] U.S. Cl. ................................. 260/146 R; 260/157; 260/208
[58] Field of Search ........... 260/157, 158, 152, 146 R, 260/208

[56] References Cited

U.S. PATENT DOCUMENTS

| | | | |
|---|---|---|---|
| 2,833,373 | 4/1959 | Bossard et al. | 260/146 R |
| 3,102,878 | 9/1963 | Baumann et al. | 260/146 R |
| 3,257,378 | 6/1966 | Sureau et al. | 260/157 |
| 3,291,788 | 12/1966 | Yamaya et al. | 260/157 |
| 3,401,158 | 9/1968 | Fisher et al. | 260/158 |
| 3,635,942 | 1/1972 | Mohr et al. | 260/157 |
| 3,654,259 | 4/1972 | Iizuka et al. | 260/157 |
| 3,679,656 | 7/1972 | Iizuka et al. | 260/157 |
| 3,926,941 | 12/1975 | Henzi | 260/146 R |
| 4,051,117 | 9/1977 | Kuhlthau et al. | 260/146 R |
| 4,248,775 | 2/1981 | Raue | 260/158 |

Primary Examiner—Floyd D. Higel
Attorney, Agent, or Firm—Sprung, Horn, Kramer & Woods

[57] ABSTRACT

In the preparation of a quaternized dyestuff of the formula

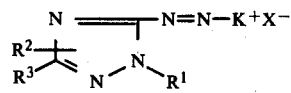

in which
$R^1$ and $R^2$ each is an optionally substituted alkyl, alkenyl or aralkyl radical,
$R^3$ is hydrogen, or an optionally substituted alkyl, aralkyl, cycloalkyl or aryl radical,
K is the radical of a coupling component+HK, and
X is an anion, wherein an aminotriazole of the formula

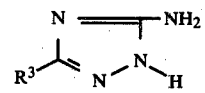

is diazotized and coupled to a coupling component HK to form an intermediate dyestuff of the formula

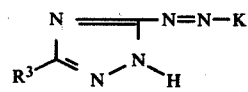

and the intermediate dyestuff is quaternized with an alkylating or aralkylating agent capable of providing the radicals $R^1$ and $R^2$ in a medium also providing the anion $X^-$, the improvement which comprises effecting the coupling at a pH of 4 to 6 and thereafter, without isolation of the intermediate dyestuff, effecting the quaternization.

6 Claims, No Drawings

ONE POT DIAZOTIZATION, COUPLING AND QUATERNIZATION OF AMINOTRIAZOLES

The present invention relates to a process for the preparation of dyestuffs of the formula

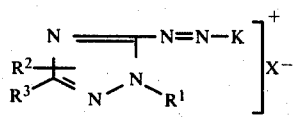

wherein
$R^1$ and $R^2$ denote optionally substituted alkyl, alkenyl or aralkyl,
$R^3$ denotes hydrogen or optionally substituted alkyl, aralkyl, cycloalkyl or aryl,
K denotes the radical of a coupling component KH and
$X^-$ denotes an anion,
and solutions or suspensions thereof, characterised in that the suspensions or solutions, obtained by coupling diazotised aminotriazoles of the formula

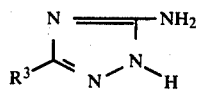

to coupling components HK, of dyestuffs of the formula

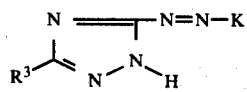

are reacted with alkylating agents or aralkylating agents which are capable of donating or forming the radicals $R^1$, $R^2$ and $X^-$, the reaction being carried out—if these agents do not form the anion $X^-$—in the presence of an acid which is a source of the anion $X^-$, and, if appropriate, the dyestuffs are isolated.

The invention also relates to the use of the dyestuffs thus obtained for dyeing acid-modified synthetic fibres, and to liquid formulations obtained by the process.

Surprisingly, it has been found that the dyestuffs of the formula 1, prepared from the azo dyestuffs of the formula 3 which have not been isolated, are outstandingly suitable for dyeing acid-modified textiles. The clarity of the colour shades thereby achieved corresponds to that obtained with dyestuffs of the formula 1 which have been prepared in the customary manner from azo dyestuffs of the formula 3 which have first been isolated. Surprisingly, the clarity of the dyeings is even improved if the dyestuffs of the formula 1 are prepared by a preferred embodiment of the new process, which embodiment is characterised in that an aminotriazole (2), a substance which forms nitrous acid, a coupling component KH and an amount of an acid such that a pH value of 4 to 6 is established are mixed in a solvent and, when the coupling has ended, the reaction mixture is neutralised or rendered alkaline, if appropriate, and is then reacted with an alkylating agent or aralkylating agent. The pH value of the mixture is kept at medium values, for example at 2–11, preferably at 6–9, during the reaction.

Examples of suitable solvents are: water; water-soluble solvents, for example alcohols, such as methanol, ethanol, propanol, isopropanol, butanol and the amyl alcohols; glycols, such as ethylene glycol, propylene glycol, butylene glycol and polyethylene glycols; glycol ethers, such as ethylglycol; glycol esters, such as methylglycol acetate and ethylglycol acetate; ketones, such as acetone and methyl ethyl ketone; carboxyamides, such as formamide, dimethylformamide, dimethylacetamide and tetramethylurea; sulpholanes, such as tetrahydrothiophene dioxide; nitriles, such as acetonitrile and ethylene cyanohydrin; ethers, such as dioxane and tetrahydrofuran; dimethylsulphoxide; N-methylpyrrolidone and hexamethylphosphoric acid triamide; or water-insoluble solvents, for example nitrobenzene, and mixtures thereof. It is also advantageous to add emulsifiers or dispersing agents.

Suitable alkylating agents or aralkylating agents are, for example: esters, such as dimethyl sulphate, diethyl sulphate, methyl benzenesulphonate and methyl p-toluenesulphonate; halogen compounds, such as butyl bromide, benzyl bromide and benzyl chloride; and epoxides, such as ethylene oxide, propylene oxide, epichlorohydrin, butylene oxide and ethoxypropylene oxide, in the presence of acids.

The substance most frequently used as the source of nitrous acid is sodium nitrite.

Suitable acids are inorganic and organic acids, above all lower fatty acids, such as, for example, formic acid, propionic acid and, particularly preferably, acetic acid.

The coupling is preferably carried out at $-10°$ to $+55°$ C. and the alkylation or quaternisation is carried out at 0° to 90° C.

In general, the first phase of the reactions of the new process is started whilst cooling, the coupling is then completed at room temperature, and thereafter, the reactions of the process are concluded by alkylation or aralkylation with renewed cooling, at room temperature or with warming.

A procedure can be followed in which the new process is started by simultaneous diazotisation of an aminotriazole 2 and coupling to a coupling component KH at $-10°$ to $+5°$ C., for example at $-5°$ C., and the coupling is brought to completion by slowly warming the mixture to 15° to 55° C., for example to 20° C., the mixture is then neutralised and cooled again to 0° to 20° C., for example to 10° C., and dimethyl sulphate is metered in, whilst maintaining a pH value of 6–10 by adding a base, such as, for example, MgO or $NaHCO_3$, the temperature again being allowed to rise slowly to 15° to 30° C., for example to 20° C.

Some other quaternising agents require higher reaction temperatures, for example up to 90° C. Other alkali metal oxides, hydroxides and carbonates or alkaline earth metal oxides, hydroxides and carbonates or tertiary amines, such as, for example, tris-(hydroxypropyl)-amine, are also suitable for maintaining a favourable pH value. The quaternisation with epoxides is carried out in the acid pH range. The reagents do not have to be added in a particular sequence. For example, a procedure can be followed in which the aminotriazole and $NaNO_2$ are initially introduced into water, it being possible to reduce the reaction volume considerably by replacing some of the water by another solvent, a mixture of a coupling component and an amount of glacial acetic acid such that a pH value of less than 6 but greater than 4 is established is then added dropwise and, when the coupling has ended, an alkylating agent is added dropwise. It is likewise possible, for example, to initially introduce equivalent amounts of glacial acetic acid, aminotriazole and a coupling component into a solvent and to add aqueous sodium nitrite solution dropwise. In this process, it has proved expedient subsequently to add a further amount of glacial acetic acid such that a pH value of about 5 is established. Since the coupling component, which is in most cases liquid, is replaced by a solid, that is to say the azo dyestuff 3, as the reaction progresses, and the reaction medium thus becomes stiffer, it is expedient to meter in an amount of water such that the mixture remains easy to stir. Since solution again takes place or a dyestuff oil is formed in the subsequent reaction with an alkylating agent, it is no longer necessary subsequently to dilute the mixture.

In the formulae, by alkyl radicals there are to be understood, in particular, $C_1$- to $C_4$-alkyl radicals. The alkyl radicals can carry non-ionic substituents. By such substituents there are to be understood, for example, halogen, hydroxyl, cyano, $C_1$- to $C_4$-alkoxy, $C_1$- to $C_4$-alkoxycarbonyl, $C_1$- to $C_3$-alkylcarbonyloxy, aminocarbonyl, phenoxy, benzyloxy, benzoyloxy, mono- or di-($C_1$- to $C_2$-alkyl)-amino, mono- or di-($C_1$- to $C_2$-alkyl)-aminocarbonyl, phenoxyalkyloxy, phenoxycarbonyloxy or phenylaminocarbonyloxy.

By halogen there is to be understood, preferably, fluorine, chlorine or bromine.

Suitable aryl radicals are, in particular, optionally substituted phenyl or naphthyl radicals.

Suitable aralkyl radicals are, in particular, optionally substituted benzyl, α-or β-phenylethyl or α-, β- or γ-phenylpropyl radicals.

By cycloalkyl there is preferably understood cyclohexyl.

Suitable substituents of these isocyclic radicals are the abovementioned substituents for the alkyl radicals, and also $C_1$- to $C_4$-alkyl.

Suitable aminotriazoles of the general formula 2 are, for example: 3-amino-1,2,4-triazole, 3-amino-5-naphthyl-1,2,4-triazole, 3-amino-5-ethyl-1,2,4-triazole, 3-amino-5-phenyl-1,2,4-triazole, 3-amino-5-cyclohexyl-1,2,4-triazole, 3-amino-5-phenoxymethyl-1,2,4-triazole and 3-amino-5-benzyl-1,2,4-triazole.

Coupling components KH are, in particular, those of the benzene, indole, indoline and tetrahydroquinoline series, for example the compounds of the formula

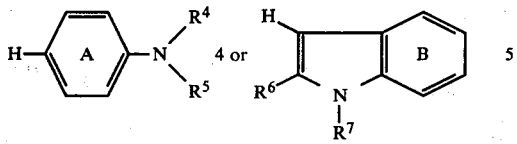

wherein
$R^4$ represents H or a saturated or unsaturated $C_1$- to $C_8$-alkyl group, which can be substituted by $R^8$,
$R^5$ represents phenyl or a saturated or unsaturated $C_1$- to $C_8$-alkyl group, which can be substituted by $R^8$,
$R^8$ represents halogen, hydroxyl, $C_1$- to $C_4$-alkoxy, cyano, acetoxy, di-($C_1$- to $C_3$-alkyl)-amino, $C_1$- to $C_2$-alkoxycarbonyloxy, $C_1$- to $C_4$-alkoxycarbonyl, aminocarbonyl, mono- or di-($C_1$- to $C_2$-alkyl)-aminocarbonyl, cyclohexyl cyclohexyloxy, phenyl, naphthyl, phenoxy, naphthoxy, benzoyloxy, phenoxyalkyloxy, phenoxycarbonyloxy, phenylaminocarbonyloxy, benzoyl or thiophenyl and the aromatic rings in $R^4$, $R^5$ and $R^8$ can in turn carry substituents, such as chlorine, methyl, ethyl, methoxy, ethoxy, phenyl or cyclohexyl, or $R^4$ and $R^5$, together with the N atom, can be joined together to form a ring, for example a pyrrolidine, piperidine, piperazine or morpholine ring, or $R^4$ and $R^5$ can be cyclised to the ring A, so that, for example, an indoline, tetrahydroquinoline, benzomorpholine or carbazole ring system which is optionally substituted by methyl, ethyl, chlorine or methoxy is formed, the rings A and B can be substituted, for example by $C_1$- to $C_4$-alkyl, halogen, $C_1$- to $C_3$-alkoxy, acetylamino, trifluoromethyl, $C_1$- to $C_2$-alkylsulphonyl or cyano, and two adjacent substituents of the ring A can be cyclised with one another, so that, together with the ring A, a tetrahydronaphthalene, naphthalene or heterocyclic ring system is formed, $R^6$ denotes methyl, ethyl or phenyl and
$R^7$ denotes H, benzyl or alkyl, which can be substituted, for example, by $R^8$.

Examples of suitable compounds of the formulae 4 and 5 are: dimethylaniline, N,N-dimethyl-m-anisidine, N,N-diethyl-m-anisidine, diethylaniline, N,N-diethyl-3-chloro-aniline, N,N-diethyl-2-chloroaniline, diisopropylaniline, N,N-diethyl-o-anisidine, N,N-dibutyl-2-chloroaniline, dibutylaniline, N,N-diethyl-3-fluoro-aniline, N,N-diethyl-2-trifluoromethyl-aniline, N-ethyl-N-cyano-ethyl-aniline, N-butyl-N,β-chloroethyl-aniline, N-methyl-N-ethyl-2-chloro-aniline, N-butyl-N,β-hydroxyethylaniline, N-ethyl-N,β-hydroxypropyl-aniline, N-methyldiphenylamine, N-ethyl-N,2-methoxycarbonyloxyethylaniline, N-ethyl-N-(2-acetoxyethyl)-aniline, N-methyl-N,β-cyanoethyl-aniline, N,N-bis-(2-cyanoethyl)-aniline, N-ethyl-N-(2-dimethylaminoethyl)-aniline, N,N-dimethyl-3-chloro-aniline, 2-dimethylamino-toluene, 3-dimethylamino-toluene, 3-diethylamino-toluene, 3-[N-ethyl-N-(2-chloroethyl)-amino]-toluene, N-ethyl-N-(2-hydroxyethyl)-3-methyl-aniline, N,N-bis-(2-cyanoethyl)-3-methylaniline, N-methyl-N-benzyl-aniline, N-methyl-N-benzyl-2-chloro-aniline, N-ethyl-N-benzyl-aniline, N-methyl-N-benzyl-o-anisidine, N-ethyl-N-benzyl-m-toluidine, 1-dimethylamino-naphthalene, 1-diethylamino-naphthalene, 3-diethylamino-acetanilide, 3-diethylamino-1-ethoxy-benzene, N,N-bis-(2-acetoxyethyl)-2-ethoxy-5-acetylaminoaniline, 3-dimethylamino-4-methyl-anisole, N-ethyl-N,β-phenylaminocarbonyloxyethyl-aniline, N-ethyl-N,β-(3-chloro-phenylaminocarbonyloxyethyl)-aniline, N-ethyl-N,β-(4-chloro-phenylaminocarbonyloxyethyl)-aniline, N-ethyl-N,β-(4-methyl-3-chloro-phenylaminocarbonyloxyethyl)-aniline, N-ethyl-N,β-benzoyloxyethyl-aniline, N-ethyl-N,β-phenoxyethyl-aniline, N-ethyl-N,β-benzyloxyethyl-aniline, N-ethyl-N,β-cyclohexyloxyethyl-aniline, N-ethyl-N,β-naphthoxyethyl-aniline, N-ethyl-N,β-benzoylethyl-aniline, N-ethyl-N,β-phenoxycarbonyloxyethyl-aniline, N-ethyl-N,β-(2,5-dichlorobenzoyloxyethyl)-aniline, N-ethyl-N,β-(p-phenyl-phenoxyethyl)-aniline, N-ethyl-N,β-benzoyloxyethyl-3-chloro-aniline, N-ethyl-N,β-benzoyloxyethyl-m-anisidine, N,N-dibutyl-m-anisidine, N,N-dibutyl-m-chloro-aniline, N-ethyl-N-benzyl-m-chloroaniline, N-methyl-N-benzyl-m-anisidine, N-methyl-N-benzyl-m-chloro-aniline, phenylmorpholine, N-phenylpiperidine, N-methyl-2,2,3-trimethyl-tetrahydroquinoline, dibenzylaniline, N,N-diethyl-2-ethyl-aniline and N-ethyl-N-benzyl-m-anisidine.

Other particularly suitable coupling components KH are mentioned, for example, in U.S. Pat. No. 4,051,117 in columns 11 to 18 and in columns 21, 23, 25, 27, 29 and 31, in U.S. Pat. No. 4,039,539 in columns 9-15, and in German Offenlegungsschriften No. 2,255,060, pages 15-16, 2,255,059, pages 15-16, and 2,255,058, pages 15-17.

Dyestuff solutions or suspensions are obtained by the new process, depending on the solvent and solubility of the dyestuffs of the formula 1 prepared. If the preferred process claimed, that is to say simultaneous diazotisation and coupling at pH values of 4 to 6, is followed, the solutions of the dyestuffs of the formula 1 which are obtained after the quaternisation in a one-pot process and are readily miscible with water are, surprisingly, suitable for use directly as dyestuff preparations for dyeing acid-modified textiles in clear colour shades. If the dyestuffs of the formula 1 are not so readily soluble in the reaction mixture, suspended oils are in most cases obtained and, if appropriate, the dyestuffs are salted out completely by stirring in salts, for which, for example, sodium sulphate or ammonium sulphate or solutions thereof are particularly suitable, the salt solution is separated off and the readily soluble oily phase is diluted to the tinctorial strength of a commercially available liquid dyeing preparation by stirring in water or another solvent (glycols are particularly suitable). Surprisingly, also these homogeneous liquid formulations prepared in a one-pot process in this manner are outstandingly suitable for producing clear colour shades on synthetic fibre materials.

The addition, for example, of alkali metal chlorides, if appropriate together with zinc chloride, bromides, tetrafluoroborates or arylsulphonates, is suitable for separating crystalline dye salts out of the reaction mixtures obtained according to the invention. It is also possible to introduce other anions $X^-$, for example those listed in German Auslegeschrift No. 2,255,058, columns 4-6, by known procedures.

In a particularly suitable procedure, the dyestuffs of the formula 1 can be isolated in pulverulent form by stirring the dyestuff oils, which have been separated off from the salt solution, with water and then adding, at elevated temperature, for example at 80°-100° C., a salt of the anion with which the dyestuff of the formula 1 readily crystallises out, switching off the stirrer and allowing the hot dyestuff oil, which immediately separates out at the bottom, to run onto a drying tray. It is particularly suitable, for example, to add alkali metal chloride or ammonium chloride and $ZnCl_2$. Surprisingly, oils isolated in this manner have a very low water content and solidify very rapidly in vacuo at elevated temperature, for example between 45° and 80° C., to give a product which can easily be ground.

In carrying out the new process, in addition to the solubility of the azo products of the formula 3 formed as the intermediate stage, the viscosity of liquid coupling components KH at low temperature should firstly be taken into consideration when choosing the solvent. Thus, anilines with small substituents on the amino group, for example dimethyl-, diethyl- or dipropyl-aniline, are so mobile even at $-5°$ C. that the process can be carried out in the presence of water as the sole solvent. In the case of many larger substituents on aniline, the viscosity below 0° C. is so high that these coupling components can no longer be suspended to a sufficient extent. Other solvents must then be added in an amount such that an easily stirrable mixture is achieved. Fine division of the reactants can also be achieved by adding dispersing agents or emulsifiers.

The intended use of the mixtures obtained when the quaternisation has ended also determines the choice of solvent. If the mixtures are to be employed directly as liquid dyestuffs for dyeing, solvents which are customary in liquid formulations are chosen, for example water, glycols, glycol esters, glycol ethers or hydroxypropionitrile.

In order to recover the non-aqueous solvents, it is possible, for example, to follow a procedure in which these solvents are distilled off, or driven off with steam, before the quaternisation.

EXAMPLE 1

495 g of N-methyl-N-benzyl-aniline are stirred with 150 ml of dimethylformamide, 150 ml of isopropanol, 150 g of glacial acetic acid and 210 g of 2-amino-1,3,4-triazole and a solution of 175 g of $NaNO_2$ in 220 ml of water is then added dropwise at $-5°$ to $-1°$ C. A further 150 g of glacial acetic acid are then added dropwise at the same temperature in the course of 45 minutes. The temperature of the mixture is then allowed to rise slowly to 15° C., the mixture is subsequently stirred for a further 2-3 hours and 1,000 ml of water are metered in at the same temperature. The mixture is stirred at room temperature until the next working day, the pH value, which is 5, is then adjusted to 7 with a quantity of concentrated sodium hydroxide solution, 42.6 g of MgO are added and 584 g of dimethyl sulphate are added dropwise at 10°-14° C. in the course of 45-60 minutes. The mixture is then subsequently stirred for 1 hour, the temperature is allowed to rise to about 15° C. and a further 219 g of dimethyl sulphate are then added dropwise. As soon as the pH value has fallen to 7, a further 17.5 g of MgO are added. The temperature should now rise to 20° C. If still unquaternised dyestuff can be detected in the thin layer chromatogram after 2 hours, a further 50 g of dimethyl sulphate are added and the mixture is stirred overnight at room temperature. The next morning, the pH value is 7. It is adjusted to 5 with a little hydrochloric acid, and 150 g of NaCl, 500 ml of saturated NaCl solution and 50 g of $ZnCl_2$ are stirred in and the stirrer is switched off. The water settles at the bottom; it is drained off and the dyestuff oil is then stirred with 2,000 ml of water and heated to 95° C. If desired, the resulting solution can be clarified with active charcoal. 130 g of $ZnCl_2$ and 375 g of sodium choloride are then stirred in at 95° C., the stirrer is switched off and the hot oil is allowed to run onto a drying tray. The dye resin solidifies in vacuo at 65° C. to give a brittle product, which can readily be ground. 855 g of a dyestuff powder of the formula

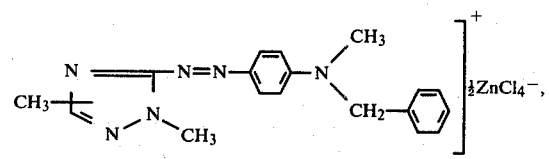

which dyes polyacrylonitrile in a somewhat clearer red than a comparable commercial dyestuff are obtained.

EXAMPLE 2

1 l of water, 210 g of aminotriazole and 175 g of NaNO₂ are stirred together and a mixture of 372.5 g of diethylaniline and 245 g of glacial acetic acid is then added dropwise at −5° to −1° C. The mixture is subsequently stirred at this temperature for 3 hours, the temperature of the mixture is allowed to rise to room temperature and the mixture is stirred until the next working day. The pH value, which is 5.1, is then adjusted to 7 with a little concentrated sodium hydroxide solution and the suspension is cooled to 10° C. 46.2 g of MgO are now stirred in at 10°–14° C., 584 g of dimethyl sulphate are added dropwise in the course of about 30–60 minutes, the mixture is subsequently stirred for 1 hour, during which the temperature should rise to 15° C., and a further 219 g of dimethyl sulphate are then added dropwise. As soon as the pH value falls to 7, a further 17.5 g of MgO are stirred in. The temperature should now rise to 19°–20° C. After subsequently stirring the mixture for about a further 1–2 hours, no further unquaternised dyestuff can be detected in the thin layer chromatogram. The pH value is adjusted to 4 with a little HCl and the mixture is stirred overnight. 3,365 g of a residue-free dyestuff solution are thus obtained, and, if desired, the solution can be clarified with active charcoal. It is stable on storage and is suitable for direct use as a dyeing preparation for dyeing acid-modified textiles. It contains the dyestuff of the formula:

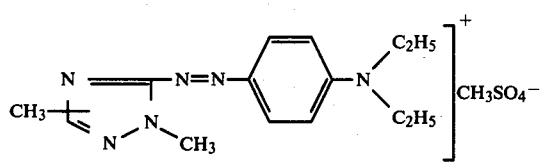

EXAMPLE 3

The procedure followed is as in Example 2, and the resulting solution is subsequently stirred with 500 ml of water, 165 g of ZnCl₂ and 570 g of NH₄Cl until the dyestuff which has precipitated crystallises. After drying in vacuo at 45° C., 1,148 g of dyestuff, which dyes DRALON in a somewhat clearer red than a comparable commercial dyestuff, are obtained.

EXAMPLE 4

530 g of N-ethyl-N-benzyl-aniline are stirred with 250 ml of dimethylformamide, 250 ml of isopropanol, 150 g of glacial acetic acid and 210 g of 2-amino-1,3,4-triazole, and a solution of 175 g of NaNO₂ in 220 ml of water is then added dropwise at −5° to −1° C. A further 150 g of glacial acetic acid are then added dropwise at the same temperature in the course of 45 minutes. The temperature of the mixture is then allowed to rise slowly to 15° C., the mixture is subsequently stirred for a further 2–3 hours at 15° C. and 1,000 ml of water and then 200 ml of dimethylformamide are metered in at the same temperature. The pH value is 5. The further treatment of the mixture and quaternisation are now carried out as described in Example 1. When the reaction has ended, 160 g of NaCl, 1,000 ml of saturated NaCl solution and 100 g of ZnCl₂ are stirred into the mixture. The viscous dye resin immediately settles at the bottom. The water is siphoned off and the dyestuff is dissolved in 2,500 ml of water at 95° C. If desired, the solution can be clarified with active charcoal. The hot solution is stirred with 80 g of ZnCl₂ and 375 g of sodium chloride, the stirrer is switched off and the hot oil is allowed to run onto a drying tray. It solidifies in vacuo at 65° C. to give a brittle product which can readily be ground. 815 g of the dyestuff powder of the formula

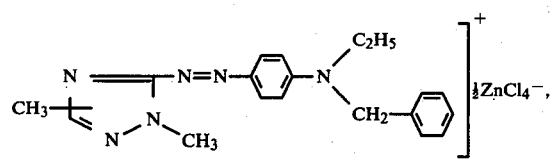

which dyes polyacrylonitrile in a clear red are obtained.

EXAMPLE 5

The procedure followed is as in Example 4, but instead of N-ethyl-N-benzyl-aniline, 672.5 g of 97.8% pure N-ethyl-N-benzoyloxyethyl-aniline are employed. After the coupling, in this case also, 1,000 ml of water are metered in, but no further dimethylformamide is added. The pH value is 5.2. The quaternisation is carried out analogous to that in Example 1. When the reactions have ended, 160 g of NaCl and 500 ml of saturated sodium chloride solution are stirred in, the stirrer is switched off and the water is drained off from the bottom. The dyestuff oil is dissolved in 2,000 ml of water at 95° C. If desired, this solution can be clarified with active charcoal. It is stirred with 165 g of ZnCl₂ and 375 g of NaCl at 95° C., the stirrer is switched off and the oil, which immediately separates out at the bottom, is drained off onto a drying tray. After drying in vacuo at 65° C., 993 g of the brittle product of the formula

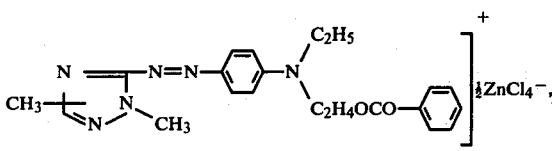

which can readily be ground and dyes polyacrylonitrile in a clear red are obtained.

An equally good result is obtained if 122.5 g of 25% strength sulphuric acid are employed instead of the first 150 g of glacial acetic acid.

EXAMPLE 6

The procedure followed is as in Example 1. When the alkylation has ended, 500 ml of saturated sodium sulphate solution are stirred in, the stirrer is switched off and the water is separated off from the dyestuff oil. The pH value of the oil is adjusted to 5 with acetic acid. 1,280 g of a dyestuff oil with a low water content are thus obtained, and the oil is brought to the strength of a commercially available liquid dyestuff by mixing with a solvent (for example ethylene glycol, propylene glycol or hydroxypropionitrile), which can be diluted with water, if appropriate. This liquid formulation is stable on storage and is suitable for use directly for dyeing polyacrylonitrile in a clear red. It contains the dyestuff of the formula

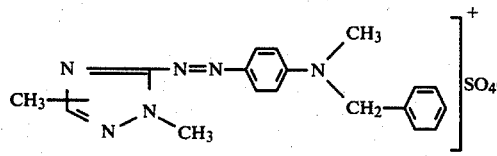

If desired, the oil can be clarified, before being formulated to the desired tinctorial strength, by stirring it with 2 l of boiling water, adding active charcoal and filtering it. 250 g of Na₂SO₄ are stirred into the filtrate, the stirrer is switched off and, after cooling, the oil which has settled at the bottom is separated off again. It is then diluted to the desired tinctorial strength with a solvent, for example with 50% strength aqueous propylene glycol solution. A formulation containing 1,000 g of ethylene glycol and 300 g of water was very stable on storage.

EXAMPLE 7

240 ml of 3-hydroxypropionitrile, 84 g of 2-amino-1,3,4-triazole, 70 g of NaNO₂ and 80 ml of water are stirred together, a solution of 70 g of glacial acetic acid in 198 g of N-methyl-N-benzyl-aniline is added dropwise at −5° to −1° C. and 50 g of glacial acetic acid are then added dropwise at −5° C. to 0° C. in the course of 2 hours. A further 200 ml of water are then added dropwise at 0° C. The mixture is subsequently stirred at 0° C. for 5 hours, the temperature is allowed to rise to room temperature and the mixture is stirred until the next working day. The pH value is 5.2. The mixture is then cooled to 10° C., 233.5 g of dimethyl sulphate are metered in and 45% strength sodium hydroxide solution is added dropwise at 10° C. until the pH value is 7. 18.5 g of MgO are then added and the temperature is allowed to rise to 15° C. in the course of 1 hour. A further 88 g of dimethyl sulphate are then added dropwise. As soon as the pH value falls to 7, a further 7 g of MgO are subsequently added. The temperature rises to 20° C. in the course of the next hour. If still unquaternised dyestuff can be detected in the thin layer chromatogram after another 2 hours, a further 50 g of dimethyl sulphate and 1 g of MgO are added and the mixture is then stirred overnight at room temperature. A homogeneous solution is obtained which, if desired, can be clarified with active charcoal. Its pH value is 6.6. The pH value is adjusted to 5 with a little acetic acid and 1,415 g of a liquid formulation which is suitable directly for dyeing polyacrylonitrile and can be diluted to a commercially available stock strength, for example with propylene glycol, are thus obtained. The formulation contains the dyestuff of the formula:

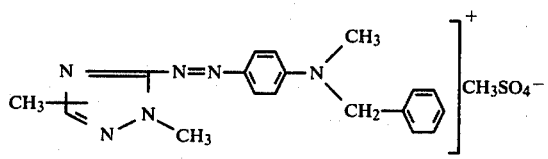

EXAMPLE 8

The procedure followed is as in Example 2, and 303 g of dimethylaniline are employed instead of 372.5 g of diethylaniline. 3,300 g of a solution which is stable on storage and is suitable directly for dyeing polyacrylonitrile in a red colour shade are thus obtained. The solution contains the dyestuff of the formula:

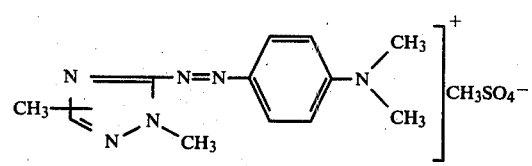

EXAMPLE 9

The procedure followed is as in Example 2, and a solution of 250 ml of butylene glycol in 250 ml of water is employed instead of 1,000 ml of water. When the reactions have ended, a further 500 ml of water are stirred in and 3,350 g of a dyestuff solution which is stable on storage and is suitable directly for dyeing polyacrylonitrile are thus obtained.

EXAMPLE 10

400 ml of water, 84 g of 2-amino-1,3,4-triazole and 70 g of NaNO₂ are stirred together and a solution of 179 g of di-n-propylaniline in 98 g of glacial acetic acid is then added dropwise at −5° C. The mixture is subsequently stirred for a further 3 hours at −5° C., and then until the next morning, without cooling. The pH value of the suspension is 5. It is adjusted to 7 with a quantity of concentrated sodium hydroxide solution, the mixture is cooled to 10° C., 18.5 g of MgO are added, and 233.5 g of dimethyl sulphate are added dropwise in the course of 30 minutes. The temperature should rise to 15° C. in the course of one hour. A further 88 g of dimethyl sulphate are then added, and as soon as the pH value has fallen to 7, a further 7 g of MgO are added. The temperature rises to 19° C. in the course of the next hour. If still unquaternised dyestuff is detected in the thin layer chromatogram after another 2 hours, a further 50 g of dimethyl sulphate are added dropwise and the mixture is then stirred at room temperature until the next morning. The pH value is then 6. It is adjusted to 5 with a little HCl. If desired, the resulting solution can be clarified with active charcoal.

The dyestuff is precipitated with sodium chloride and zinc chloride, filtered off and dried. 379.3 g of the dyestuff of the formula

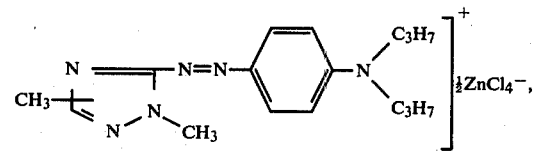

which dyes polyacrylonitrile in a clear red are obtained.

EXAMPLE 11

250 ml of dimethylformamide, 250 ml of isopropanol, 150 g of glacial acetic acid, 210 g of aminotriazole and 672.5 g of N-ethyl-N,β-benzoyloxyethylaniline are stirred together and a solution of 175 g of NaNO₂ in 220 ml of water is added dropwise at −5° to −1° C. in the course of 30 minutes. A further 150 g of glacial acetic acid are then added dropwise at the same temperature in the course of 45 minutes. The temperature of the mixture is then allowed to rise slowly to 15° C., the mixture is subsequently stirred for a further 3 hours at 15° C. and 1,000 ml of water are metered in at the same temperature. The mixture is stirred at room temperature until the next working day and the pH value, which is 5.2, is then adjusted to 7 with a quantity of concentrated sodium hydroxide solution, 46.2 g of MgO are added and 584 g of dimethyl sulphate are added dropwise at 10°-14° C. in the course of 45 minutes. The mixture is subsequently stirred for 1 hour, during which the temperature is allowed to rise to 15° C., and a further 219 g of dimethyl sulphate are then added dropwise. As soon as the pH value falls to 7, a further 17.5 g of MgO are added. The temperature should now rise to 20° C. in the course of 1 hour. If still unquaternised dyestuff is detected in the thin layer chromatogram after 3 hours, a further 50 g of dimethyl sulphate and 1 g of MgO are added and the mixture is then stirred overnight at room temperature. The next morning, the pH value is 7. It is adjusted to 5 with a little sulphuric acid and 500 ml of saturated sodium sulphate solution are stirred in. The stirrer is then switched off and the water which settles at the bottom is separated off. 1,590 g of a dyestuff oil which has a low water content and which can be formulated to the strength of a commercially available dyestuff solution by mixing with a solvent (for example with methylglycol acetate or ethylene glycol), which can optionally be diluted with water, are thus obtained.

The formulation with 930 g of ethylene glycol is stable on storage and is suitable directly for dyeing acid-modified synthetic fibres in red shades. It contains the dyestuff of the formula:

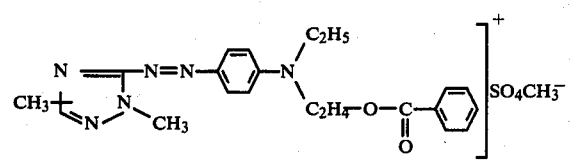

If desired, the dyestuff oil can be clarified, for example in accordance with the instructions given in Example 6.

EXAMPLE 2

The procedure followed is as in Example 7, but instead of 198 g of N-methyl-N-benzyl-aniline, 212 g of di-n-butylaniline are employed. The solution obtained when the quaternisation has ended is stirred with 200 ml of saturated sodium chloride solution and the water which settles out at the bottom is then separated off. The dyestuff oil thus isolated is stirred into 800 ml of water of 70° C. and the mixture is clarified with active charcoal and stirred with 160 g of sodium chloride. When the dyestuff has crystallised out completely, it is filtered off and dried in vacuo at 50° C. 390 g of the dyestuff of the formula

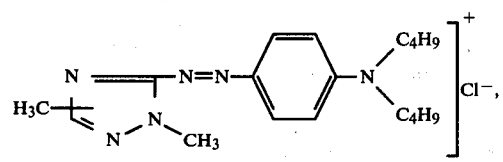

which dyes polyacrylonitrile in an intensely bluish-tinged red are obtained.

EXAMPLE 13

If the procedure followed is as in Example 2, but the dimethyl sulphate is replaced by the equimolar amount of diethyl sulphate and the reaction temperature during the alkylation and quaternisation is increased by 5° C., the red dyestuff of the formula:

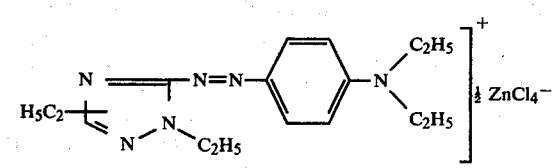

is obtained. This dyestuff dyes DRALON in a red colour shade.

EXAMPLE 14

An equally good result to that in Example 3 is obtained if, instead of MgO, 500 g of NaHCO$_3$ are stirred in and the reaction temperature is increased to 30° C. towards the end.

EXAMPLE 15

The procedure followed is as in Example 10, but instead of 179 g of di-n-propyl-aniline, 160 g of N-methyl-N,β-cyanoethyl-aniline are employed and, when the reactions have ended, the dyestuff is precipitated with sodium chloride without the addition of ZnCl$_2$. 368.5 g of the dyestuff of the formula:

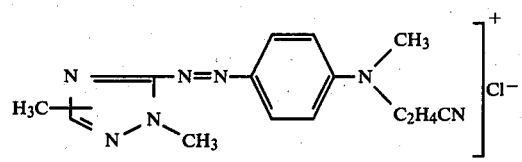

are obtained. The dyestuff dyes polyacrylonitrile in a red colour shade.

EXAMPLE 16

The procedure followed is as in Example 3, but instead of 372.5 g of diethylaniline, 388 g of N,N-dimethyl-3-chloro-aniline are employed. The red dyestuff of the formula:

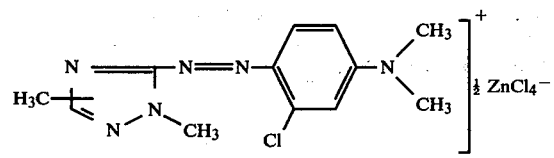

is obtained.

EXAMPLE 17

Polyacrylonitrile fibres are introduced, at 40° C. and in a liquor ratio of 1:40, into an aqueous bath containing, per liter, 0.75 g of 30% strength acetic acid, 0.38 g of sodium acetate and 0.3 g of the dyestuff/glycol solution described in Example 6. The bath is heated to the boiling point in the course of 20–30 minutes and kept at this temperature for 30–60 minutes. After rinsing and drying the fibres, a clear red dyeing with very good fastness properties is obtained.

EXAMPLE 18

Polyacrylonitrile fibres are introduced, at 40° C. and in a liquor ratio of 1:40, into an aqueous bath containing, per liter, 0.75 g of 30% strength acetic acid, 0.38 g of sodium acetate and 0.45 g of the dyestuff solution described in Example 2. The bath is heated to the boiling point in the course of 20–30 minutes and kept at this temperature for 30–60 minutes. After rinsing and drying the fibres, a red dyeing with very good fastness properties is obtained.

EXAMPLE 19

Acid-modified polyglycol terephthalate fibres are introduced, at 20° C. and in a liquor ratio of 1:40, into an aqueous bath which contains, per liter, 3–10 g of sodium sulphate, 0.1–1 g oleyl alcohol polyglycol ether (obtained from 1 mol of oleyl alcohol and 50 mols of ethylene oxide), 0–15 g of dimethylbenzyldodecylammonium chloride and 0.15 g of the dyestuff powder described in Example 5, and has been adjusted to pH 4–5 with acetic acid. The bath is heated to 100° C. in the course of 30 minutes and kept at this temperature for 60 minutes. The fibres are then rinsed and dried. A red dyeing with very good fastness properties is obtained.

EXAMPLE 20

If the procedure followed is analogous to that in Example 3, but instead of 3-amino-1,2,4-triazole, 3-amino-5-methyl-1,2,4-triazole is employed, the dyestuff of of the formula:

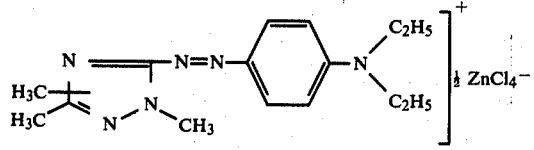

is obtained. This dyestuff dyes polyacrylonitrile in a red colour shade.

EXAMPLE 21

The procedure followed is as in Example 1, but instead of 150 ml of dimethylformamide and 150 ml of isopropanol, a solution of 25 g of an aromatic polyglycol ether in 2 l of water is employed as the solvent, and the subsequent addition of 1,000 ml of water is dispensed with.

The dyestuff described in Example 1 is obtained in a good yield.

EXAMPLE 22

The procedure followed is as in Example 1, but the solvents employed in that example (150 ml of dimethylformamide and 150 ml of isopropanol) are replaced by 1,000 ml of methanol. After subsequently stirring at 15° C. and after adding 1,000 ml of water, the mixture is warmed slowly to 40° C., subsequently stirred at this temperature for 3 hours and then heated further to 60°–65° C. Steam is then passed in until no further methanol distils off, and the mixture is cooled to 10° C., during which the pH value is adjusted to 7, and the subsequent procedure is as in Example 1. The same good result as in Example 1 is obtained.

EXAMPLE 23

If the procedure followed is as in Example 22, but the 495 g of N-methyl-N-benzyl-aniline are replaced by 362 g of 1,2-dimethyl-indole, when $ZnCl_2$ is added, the solid dyestuff of the formula

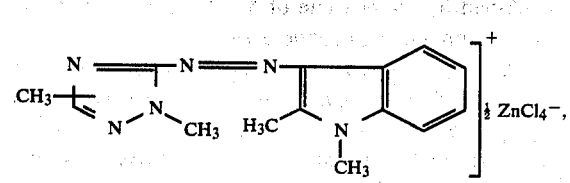

which dyes polyacrylonitrile in a reddish-tinged yellow with very good fastness properties, is obtained instead of the dyestuff oil.

I claim:
1. In the preparation of a quaternized dyestuff of the formula

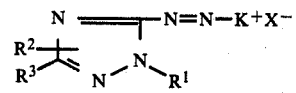

in which
$R^1$ and $R^2$ each is a $C_1$- to $C_4$-alkyl or alkenyl radical, or a $C_1$–$C_4$-alkyl or alkenyl radical substituted by halogen, hydroxyl, cyano, $C_1$- to $C_4$-alkoxy, $C_1$- to $C_4$-alkoxycarbonyl, $C_1$–$C_3$-alkylcarbonyloxy, aminocarbonyl, phenoxy, benzyloxy, benzoyloxy, mono- or di-($C_1$ to $C_2$-alkyl)-amino, mono- or di-($C_1$- to $C_2$-alkyl)-aminocarbonyl, phenylalkyloxy, phenoxycarbonyloxy or phenylaminocarbonyloxy; a benzyl, α- or β-phenethyl or α-, β- or γ-phenylpropyl radical; or a benzyl, α- or β-phenylethyl or α-, β- or γ-phenylpropyl radical substituted by $C_1$- to $C_4$-alkyl or by any of the substituents set forth in connection with alkyl;
$R_3$ is hydrogen; a $C_1$- to $C_4$-alkyl radical; a $C_1$- to $C_4$-alkyl radical substituted as in $R^1$ and $R^2$; a cyclohexyl, phenyl, naphthyl, benzyl, α- or β-phenylethyl or α-, β- or γ-phenylpropyl radical; or a cyclohexyl, phenyl, naphthyl, benzyl, α- or β-phenylethyl or α-, β- or γ-phenylpropyl radical substituted by $C_1$ to $C_4$-alkyl or by any of the substituents set forth in connection with alkyl;
K is the radical of a coupling component HK, and p1
X is an anion,
wherein an aminotriazole of the formula

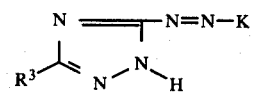

is diazotized and coupled to a coupling component HK to form an intermediate dyestuff of the formula $$N \underset{N}{\overset{N}{\underset{\|}{\diagup\!\!\!\diagdown}}} N=N-K$$

and the intermediate dyestuff is quaternized with an alkylating or aralkylating agent capable of providing the radicals $R^1$ and $R^2$ in a medium also providing the anion X⁻, the improvement which comprises effecting the coupling at a pH of 4 to 6 and thereafter, without isolation of the intermediate dyestuff, effecting the quaternization.

2. A process according to claim 1, wherein the pH is established by at least one of hydrochloric, sulphuric, formic, propionic and acetic acids.

3. A process according to claim 1, wherein at least one of water and a water-miscible organic solvent is employed as a solvent.

4. A process according to claim 1, wherein a water-insoluble organic solvent or an aqueous suspension thereof is employed as a solvent.

5. A process according to claim 1, wherein the coupling component is an indole of the formula

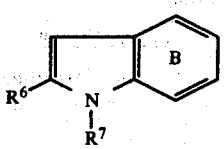

6. A process according to claim 1, wherein the coupling component is a compound of the formula

* * * * *

UNITED STATES PATENT AND TRADEMARK OFFICE
CERTIFICATE OF CORRECTION

PATENT NO. : 4,392,998

DATED : July 12, 1983

INVENTOR(S) : Hans-Peter Kuhlthau

It is certified that error appears in the above-identified patent and that said Letters Patent is hereby corrected as shown below:

Col. 11, line 45            Delete "Example 2" and insert --Example 12--

Col. 14, line 49            After "and" delete "p 1"

Signed and Sealed this

Eighteenth Day of October 1983

[SEAL]

*Attest:*

*Attesting Officer*

GERALD J. MOSSINGHOFF

*Commissioner of Patents and Trademarks*